United States Patent
Cai (10) Patent No.: US 11,773,836 B2
(45) Date of Patent: Oct. 3, 2023

(54) EXTERNAL FUEL PUMP AND VALVE SEAT FOR THE FUEL PUMP

(71) Applicant: ZHEJIANG SHUANGLIANG AUTOMOBILE PARTS CO., LTD., Lishui (CN)

(72) Inventor: Liangbao Cai, Lishui (CN)

(73) Assignee: ZHEJIANG SHUANGLIANG AUTOMOBILE PARTS CO., LTD., Lishu (CN)

( * ) Notice: Subject to any disclaimer, the term of this patent is extended or adjusted under 35 U.S.C. 154(b) by 371 days.

(21) Appl. No.: 17/294,694

(22) PCT Filed: Oct. 12, 2020

(86) PCT No.: PCT/CN2020/120292
§ 371 (c)(1),
(2) Date: May 18, 2021

(87) PCT Pub. No.: WO2021/189812
PCT Pub. Date: Sep. 30, 2021

(65) Prior Publication Data
US 2022/0307488 A1 Sep. 29, 2022

(30) Foreign Application Priority Data

Mar. 25, 2020 (CN) .......................... 202020397630.8
Mar. 25, 2020 (CN) .......................... 202020398356.6

(51) Int. Cl.
*F02M 59/44* (2006.01)
*F04B 23/02* (2006.01)
(Continued)

(52) U.S. Cl.
CPC ............ *F04B 23/025* (2013.01); *B01D 17/00* (2013.01); *B01D 45/08* (2013.01); *F02M 59/44* (2013.01)

(58) Field of Classification Search
CPC .... F04B 23/025; F04B 53/1087; F04B 53/22; F04B 53/10; B01D 17/00; B01D 45/08;
(Continued)

(56) References Cited

U.S. PATENT DOCUMENTS 5,738,132 A * 4/1998 Zakai ............... B60K 15/03519
137/43
7,273,042 B2 * 9/2007 Kito ...................... F16K 24/042
123/518

(Continued)

FOREIGN PATENT DOCUMENTS

CN 202451322 U 9/2012
CN 107461282 A 12/2017
(Continued)

*Primary Examiner* — Hai H Huynh
(74) *Attorney, Agent, or Firm* — Bayramoglu Law Offices LLC (57) ABSTRACT

An external fuel pump and a valve seat for the fuel pump are provided. The valve seat includes a valve body. One side of the valve seat body is provided with an installation chamber for installing a valve body, and the other side of the valve seat body is an oil separator. The oil separator is connected to an outer wall of the installation chamber. The external fuel pump includes the valve seat and a fuel chamber constituted by a housing and a cover. The valve seat body is located in the fuel chamber, the oil separator of the valve seat body is located at a lower portion of an exhaust port provided on the cover. An anti-flip mechanism is provided between the exhaust port and the oil separator. The valve seat is multifunctional and convenient to install with less space and fewer components, which reduces costs.

20 Claims, 9 Drawing Sheets

(51) Int. Cl.
  *B01D 45/08*   (2006.01)
  *B01D 17/00*   (2006.01)
(58) Field of Classification Search
  CPC .... F02M 59/44; F02M 37/0023; F02M 37/04; F02M 37/20
  USPC ....... 123/446, 457, 459, 461, 506, 510, 511, 123/514, 529, 198 D
  See application file for complete search history.

(56) References Cited

U.S. PATENT DOCUMENTS

| | | | |
|---|---|---|---|
| 7,677,225 B2* | 3/2010 | Radue | F02M 37/007 |
| | | | 123/509 |
| 10,041,456 B2* | 8/2018 | Radue | F02M 37/20 |

FOREIGN PATENT DOCUMENTS

| | | |
|---|---|---|
| CN | 107542599 A | 1/2018 |
| CN | 207500026 U | 6/2018 |
| CN | 209557146 U | 10/2019 |
| CN | 209781090 U | 12/2019 |
| CN | 107542599 B | 2/2020 |
| JP | 2000266208 A | 9/2000 |
| JP | 2006046136 A | 2/2006 |

* cited by examiner

EXTERNAL FUEL PUMP AND VALVE SEAT FOR THE FUEL PUMP

CROSS REFERENCE TO THE RELATED APPLICATIONS

This application is the national stage entry of International Application No. PCT/CN2020/120292, filed on Oct. 12, 2020, which is based upon and claims priority to Chinese Patent Application No. 202020398356.6, filed on Mar. 25, 2020, and Chinese Patent Application No. 202020397630.8, filed on Mar. 25, 2020, the entire contents of which are incorporated herein by reference.

TECHNICAL FIELD

The present invention relates to an external fuel pump arranged outside an oil tank, and a valve seat used in the fuel pump.

BACKGROUND

Chinese patent CN107542599B discloses a system and method for fuel delivery that includes a stopper seated in a cavity below the vent tube, and the cavity is formed by walls. When a vehicle/engine turns over, the stopper moves to seat at an entrance of the vent tube to block flow of fuel through the vent tube, especially to prevent the fuel from flowing into the environment. The stopper can move back to the cavity to unblock the vent tube when the engine is restored in a normal upright position. In some examples, a lower cup is positioned in a lower part of the cavity to support the stopper. The lower cup serves as a floor of the cavity for the stopper to rest on. A convex portion of the floor protrudes above a substantially flat plane of the floor so that the stopper is unable to rest on the convex portion of the floor.

In some examples, the lower cup can sit within three equally spaced legs forming three alternatively spaced flow path openings. The numbers of legs and flow paths are optional, and the legs and the flow paths need not be equally spaced, which depends on the implementation. The flow paths allow vapors to flow from the fuel pump module to the surroundings or other part of the engine when the float mechanism is open.

The fuel delivery system disclosed in the above patent does not specify whether it is necessary to provide a pressure regulation valve to regulate a flow rate of an output pipe. Pressure regulation valves for oil output of other existing fuel pumps can only regulate the flow rate, and the existing pressure regulation valve is typically installed in the cavity through a fastener. In addition, a flow path of an anti-flip portion in the above patent is formed through a gap between the leg and the lower cup. The fuel path provided in this way is directly communicated with an oil cavity at a lower portion, and the vibration of the fuel pump during operation will cause the fuel to splash into the cavity from the flow path. In addition, the fuel would immediately flow into the cavity as the turnover is happening, and a small portion of the fuel may still flow out through the exhaust pipe, thereby causing waste and potential danger. In addition, Chinese patent CN107542599A discloses a system and method for vibration resistant rollover valve, and particularly discloses: a stopper sits in a cavity below the vent tube and the cavity is formed by walls. When a vehicle/engine rolls over, the stopper moves to sit in a seat positioned at an entrance of the vent tube to block and/or seal off any outflow of the fuel, through the vent tube, especially to prevent the fuel from flowing into the environment. The stopper can move back to the cavity to unblock the vent tube when the engine is restored in a normal upright position. In some examples, a lower cup is positioned in a lower part of the cavity to support the stopper. The lower cup serves as a floor of the cavity for the stopper to rest on. A convex portion of the floor protrudes above a basically flat plane of the floor so that the stopper is unable to rest on the convex portion of the floor. In some examples, the lower cup can sit within three equally spaced legs forming three alternatively spaced flow path openings. The numbers of legs and flow paths are optional, and also, the legs and the flow paths need not be equally spaced, which depends on the implementation. The flow paths allow vapors to flow from the fuel pump module to the surroundings or other part of the engine when the float mechanism is open.

In the flip valve of the above patent, a cavity is provided under the exhaust pipe, a stopper is placed in the cavity, and the cavity encloses the lower cup under the wall through the wall so that a flow path for entry and discharge of the fuel is formed by the leg of the lower cup and the lower cup. When the fuel pump turns over, the exhaust pipe is blocked by the stopper to prevent the fuel from flowing out of the exhaust pipe. However, the defect existing in the above patent is that flow path thereof is formed by a gap between the leg and the lower cup, such that the fuel path is directly in communication with an oil cavity at a lower portion, and the vibration of the fuel pump during operation will cause the fuel to splash into the cavity from the flow path. In addition, the fuel would immediately flow into the cavity during turnover, and a small portion of the fuel may still flow out through the exhaust pipe, thereby causing waste and potential hazard.

SUMMARY

A first objective of the present invention is to provide an external fuel pump and a multi-function valve seat used in the fuel pump.

In order to achieve the above objective, the present invention is implemented in such a way: a valve seat for the fuel pump includes a valve seat body. One side of the valve seat body is provided with an installation chamber for installing a valve body. The other side of the valve seat body is an oil separator, and the oil separator is connected to an outer wall of the installation chamber. In this way, the valve seat not only can provide a valve seat for installing the valve body, especially a pressure regulation valve, to the fuel pump, but also can block an exhaust port and a lower fuel chamber of the fuel pump through the oil separator at the same time, to prevent the fuel in the lower fuel chamber from splashing out from the exhaust port during vibration, or avoid the fuel overflowing from the exhaust port during the flip process, which is multi-functional.

In order to further prevent the fuel from overflowing from the exhaust port, an edge of the oil separator is provided with an oil baffle arranged upward, and the oil baffle is provided with a first oil outlet. In order to further prevent the fuel from overflowing from the installation seat, the installation chamber is an installation groove having a cavity, and one side of the installation groove is provided with a second oil outlet.

In order to further prevent the fuel from overflowing from the installation seat and further overflowing from the exhaust port, an upper wall of the second oil outlet has a second separator extending outside the installation groove.

Preferably, the first oil outlet and the second oil outlet are provided on opposite sides of the valve seat body.

Preferably, the oil separator is fan-shaped, and two sides thereof gradually expand from a connection portion with the installation chamber to the outermost direction.

In order to further prevent the splashed fuel from overflowing from the exhaust port, the lower portion of the first oil outlet is provided with a first separator extending laterally from the valve seat body.

In order to further implement the installation, the outermost side of the oil separator and the outermost side of the installation chamber are both provided with installation walls, and the installation walls are provided with elastic clamping parts.

A second objective of the present invention is to provide an external fuel pump for preventing the fuel from overflowing from an exhaust port.

An external fuel pump includes the above valve seat and further includes a fuel chamber composed of a housing and a cover. The valve seat body is located in the fuel chamber. The oil separator of the valve seat body is located at a lower portion of the exhaust port provided on the cover. An anti-flip mechanism is provided between the exhaust port and the oil separator. The exhaust port is provided with an exhaust pipe extending upward. The anti-flip mechanism includes a side wall extending downward from a lower end of the exhaust pipe. An exhaust cavity is formed by the side wall and the oil separator. The exhaust cavity is communicated with the exhaust pipe. A movable stopper is provided in the exhaust cavity. The side wall is provided with exhaust notches, and the exhaust notches are communicated with the fuel chamber. Through the above arrangement, the notches are provided on the side wall above the oil separator to prevent the splashed fuel caused by vibrations from entering the exhaust cavity in normal use, and further avoids the problem of the fuel overflowing from the exhaust pipe in the exhaust cavity when the fuel pump flips over, thereby preventing the fuel leakage from the exhaust pipe and improving the use safety of the fuel delivery system.

Preferably, the stopper is a sphere, and a diameter of the sphere is greater than an inner diameter of the exhaust pipe.

Preferably, the side wall has a conical wall extending downward and outward from a lower opening of the exhaust pipe, an opening of the conical wall has a cylindrical wall extending downward, and the notches are provided on the cylindrical wall.

In order to further facilitate the gas discharging, the notches extend from the top of the cylindrical wall to the bottom of the cylindrical wall, and the plurality of notches are provided along the circumference of the cylindrical wall.

In order to further prevent the fuel from splashing into the exhaust cavity, the valve seat body is installed on an inner wall of the cover or the housing through the elastic clamping par. A pressure regulation valve for the fuel output is installed in the installation chamber of the valve seat body. A gasket and a sealing ring that fit each other are provided between the lower portion of the pressure regulation valve and the installation groove, and a gasket and a sealing ring that fit each other are provided between the upper portion of the pressure regulation valve and the cover.

Advantageous Effects

The valve seat for the external fuel pump provided in the present invention can prevent the splashed fuel from entering the exhaust port and overflowing from the exhaust pipe when the fuel pump shakes. Moreover, the valve seat can prevent the fuel from entering the exhaust pipe and flowing out when the fuel pump flips over; and can prevent the fuel from overflowing from the installation seat of the pressure regulation valve from overflowing through the exhaust port. The valve seat of the present invention integrates multiple functions, and it is convenient to install the valve seat, with less space and fewer components, which reduces the costs.

The external fuel pump provided in the present invention can prevent the fuel in the oil cavity from being discharged to the outside space through the exhaust pipe when the fuel pump flips or topples, and can also prevent the splashed fuel caused by vibrations from entering the exhaust cavity during normal use, which not only prevents pollution, but also improves the safety performance, thereby ensuring the application safety of the engine, and preventing pollution to the environment.

Figure 1:
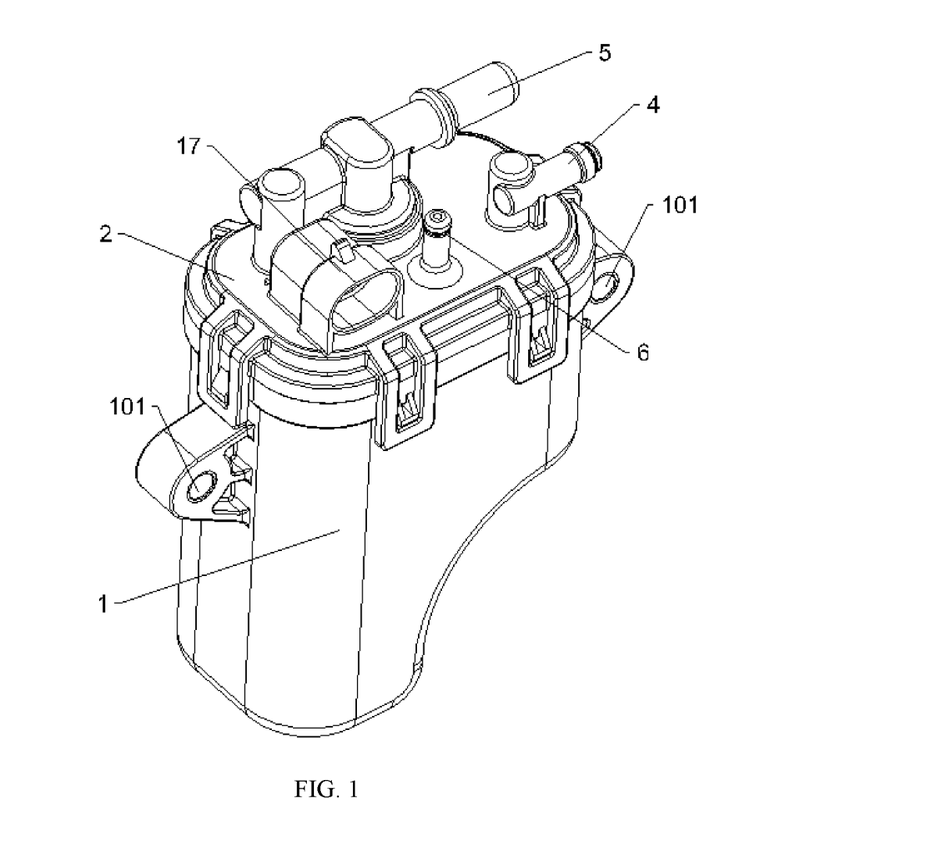
FIG. 1 is an axonometric diagram of an external fuel pump of the present invention.
Figure 2:
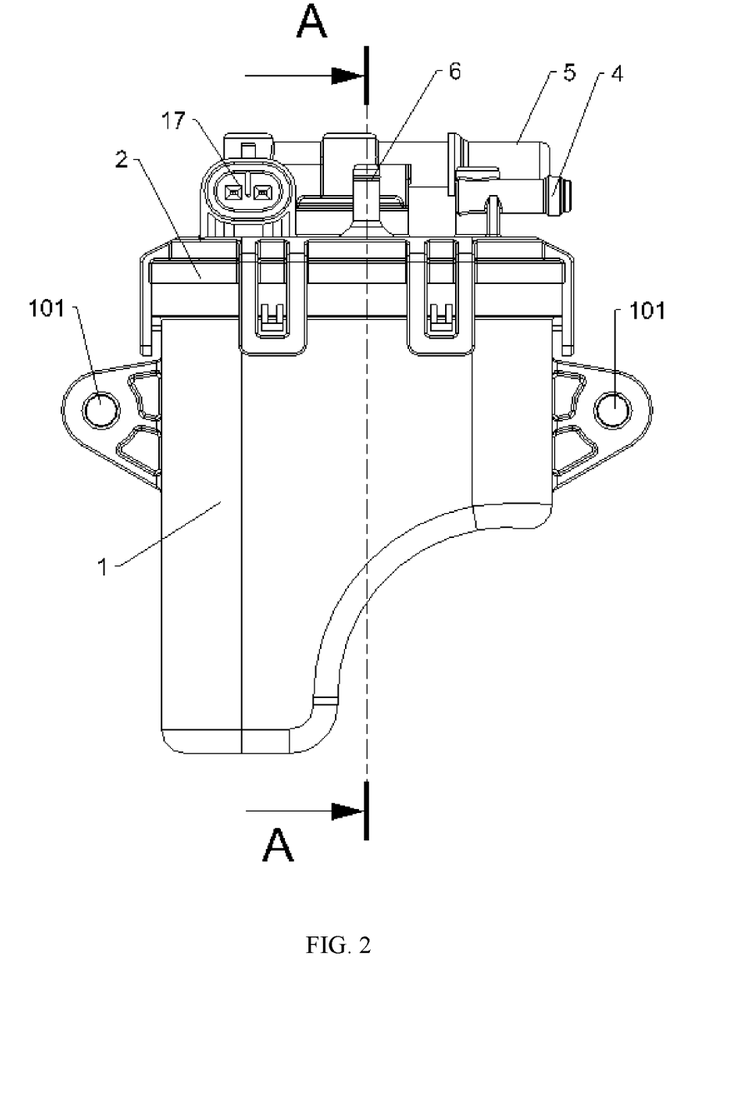
FIG. 2 is a front view of the external fuel pump of the present invention.
Figure 3:
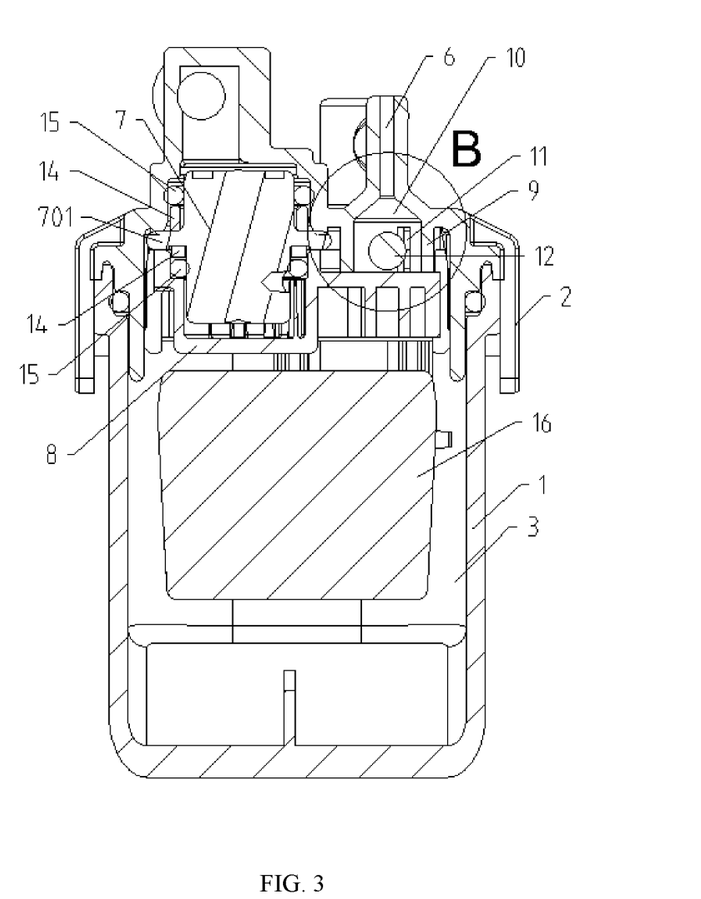
FIG. 3 is a cross-sectional view taken from the line A-A of FIG. 2.
Figure 4:
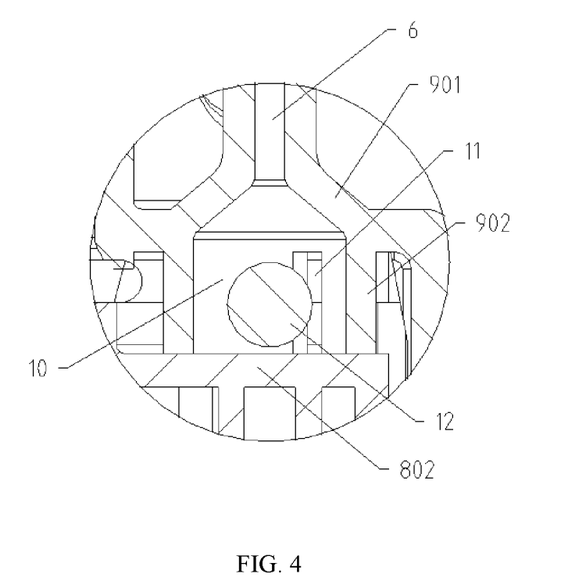
FIG. 4 is an enlarged view showing the area B of FIG. 3.
Figure 5:
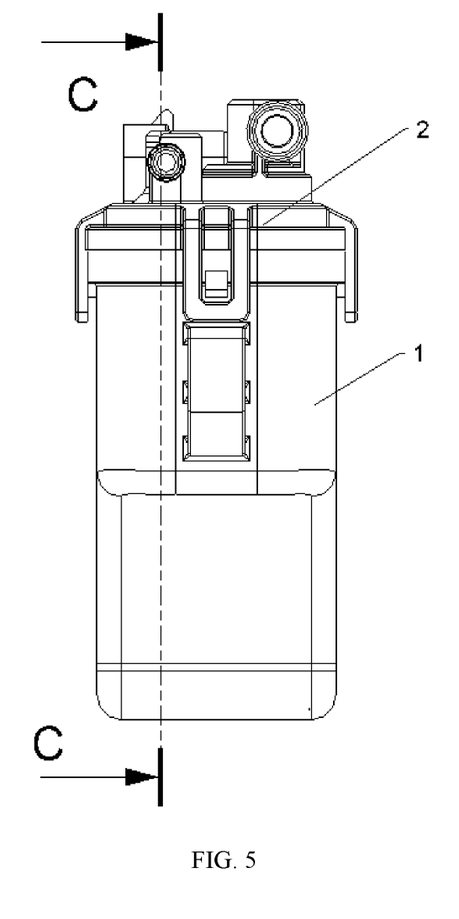
FIG. 5 is a right view of FIG. 2.
Figure 6:
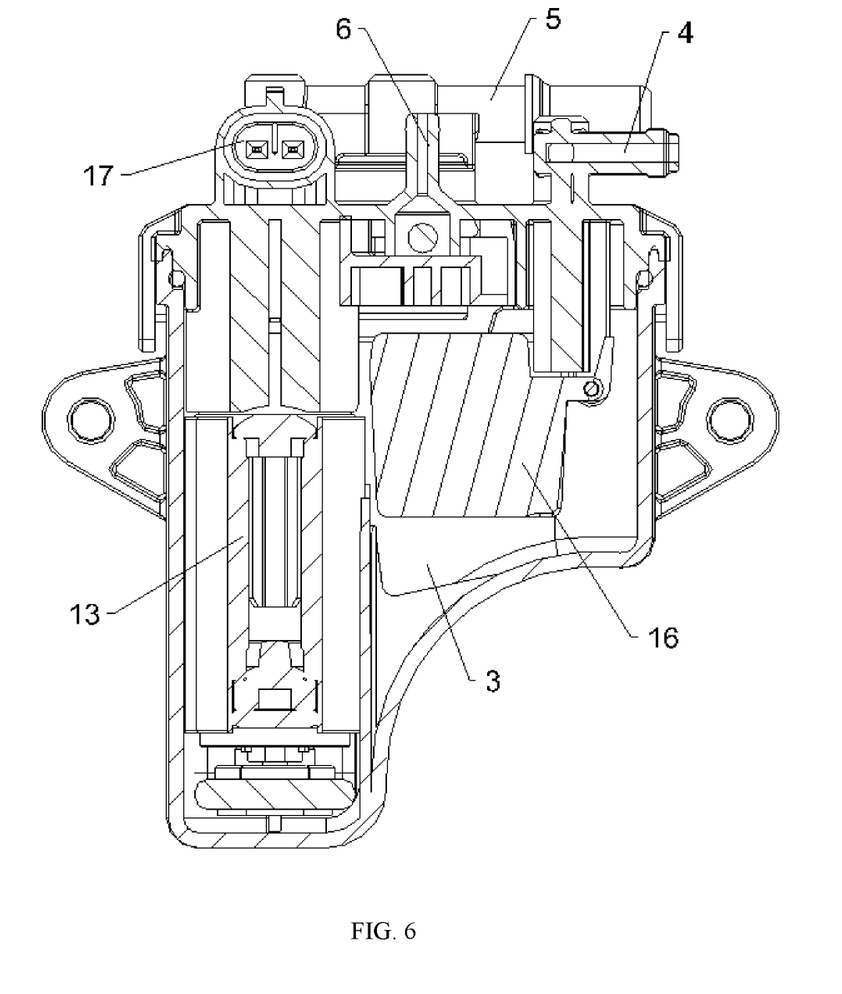
FIG. 6 is a cross-sectional view taken from the line C-C of FIG. 5.
Figure 7:
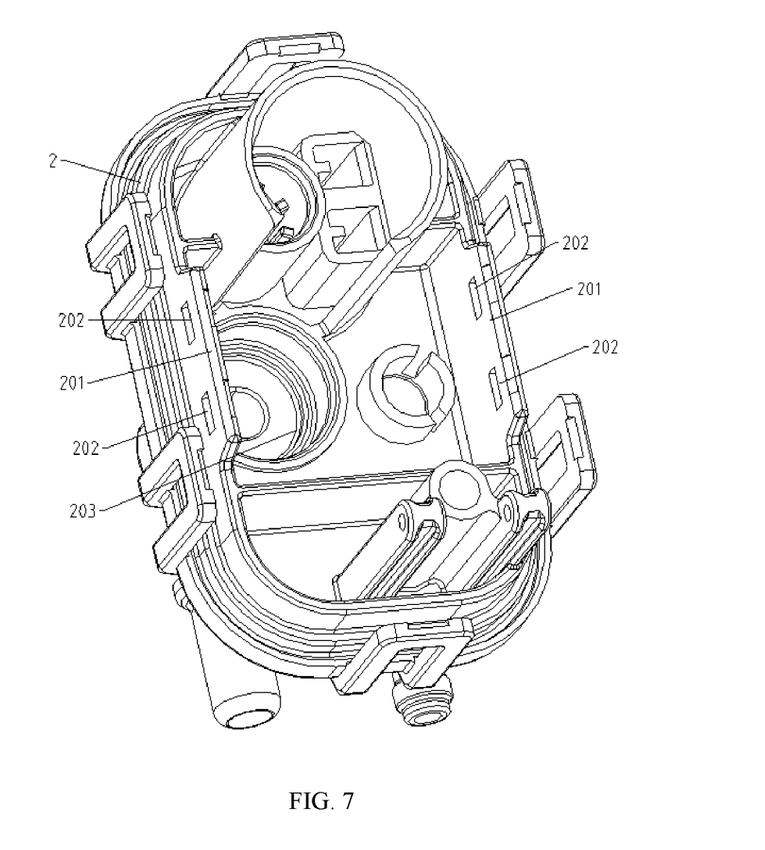
FIG. 7 is a structure diagram of a cover of the external fuel pump of the present invention.
Figure 8:
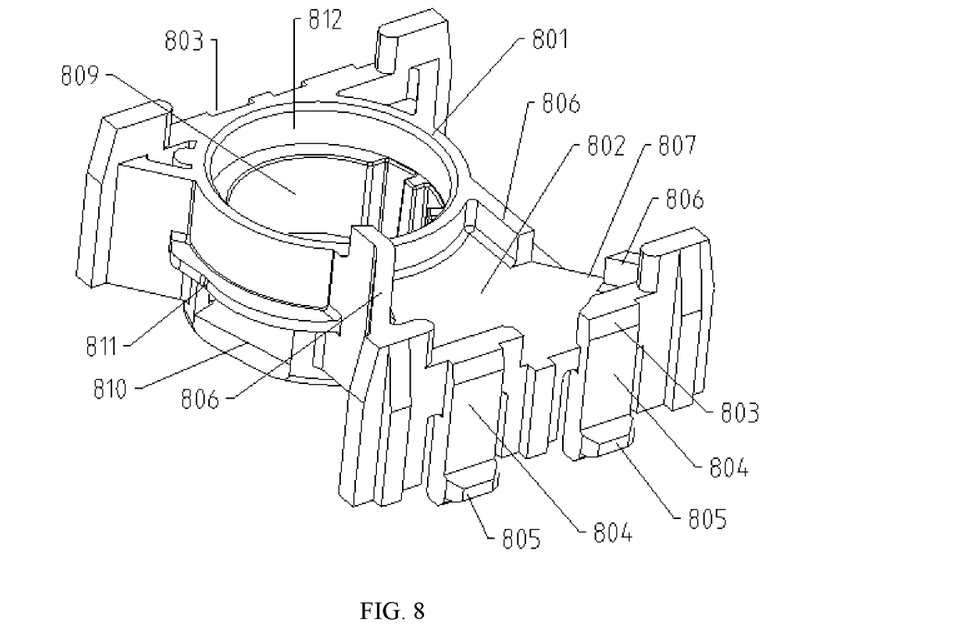
FIG. 8 is a first structure diagram of a valve seat of the external fuel pump of the present invention.
Figure 9:
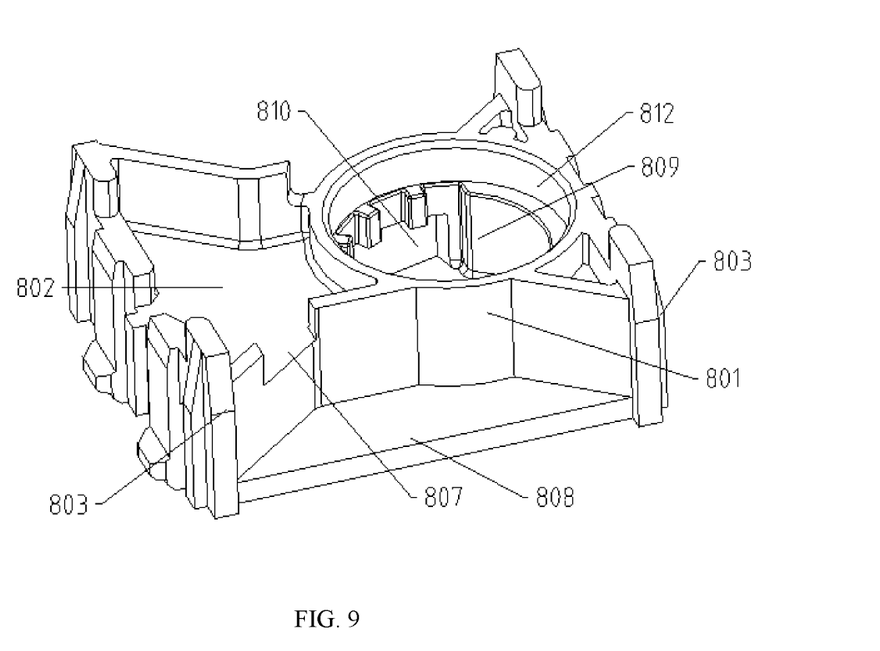
FIG. 9 is a second structure diagram of the valve seat of the external fuel pump of the present invention.

Explanations for Reference Numbers: 1. Housing, 101. Fixing Hole; 2. Cover, 201. Support Lug, 202. Installation Opening, 203. Pressure Regulation Valve Installation Seat; 3. Fuel Chamber; 4. Fuel Input Pipe; 5. Fuel Output Pipe; 6. Exhaust Pipe; 7. Pressure Regulation Valve, 701. Annular Limit Protrusion; 8. Valve Seat, 801. Installation Chamber, 802. Oil Separator, 803. Installation Wall, 804. Elastic Clamping Part, 805. Clamping Portion, 806. Oil Baffle; 807. First Oil Outlet, 808. First Separator, 809. Installation Groove, 810. Second Oil Outlet, 811. Second Separator, 812. Annular Installation Portion; 9. Side Wall, 901. Conical Wall, 902. Cylindrical Wall; 10. Exhaust Cavity; 11. Exhaust Notch; 12. Steel Ball; 13. Valve Core; 14. Gasket; 15. Sealing Ring; 16. Float Mechanism; 17. Wiring Terminal.

DETAILED DESCRIPTION OF EMBODIMENTS

The specific embodiments of the present invention will be further explained in detail hereinafter in conjunction with the drawings, but the present invention is not limited to these embodiments, and any improvement or replacement on the basic spirit of the present embodiments still belongs to the scope claimed in the claims of the present invention.

Embodiment: the present embodiment provides an external fuel pump, and a valve seat used in the external fuel pump. The external fuel pump is generally provided between a fuel tank and an engine, and is configured to pressurize the fuel in the fuel tank and pump it into the engine. In addition, the engine is a small general internal combustion engine that can be applied to various occasions, such as a lawn mower, a snow plow or any other small vehicle for multiple usages.

The external fuel pump generally includes a housing 1 and a cover 2. The housing fits the cover to form a fuel chamber 3. The cover is provided with a fuel input pipe 4 thereon for connection with the fuel tank. The fuel in the fuel tank is delivered to the fuel chamber through the pipe. The cover is further provided with a fuel output pipe 5, and the fuel output pipe is connected to the engine through the pipe to deliver the pressurized fuel into the engine. Moreover, a pressure regulation valve 7 is installed in the fuel chamber. The pressure regulation valve is fixed in the fuel chamber through a valve seat 8, and acts on the fuel output pipe to regulate the flow rate of the fuel output pipe.

In addition, an exhaust pipe 6 is further provided on the cover. The exhaust pipe 6 is arranged vertically upward and extends outsides, and the exhaust pipe is communicated with the fuel chamber to discharge gas generated by the evaporation of the fuel in the fuel chamber to the external environment, or guide the fuel vapor in the exhaust pipe into an air intake system of the engine through a connector of the accessory.

In normal use, the exhaust pipe is vertically upward, and the fuel cannot be discharged outside through the exhaust pipe. However, when the fuel pump shakes severely, the fuel in the fuel cavity is likely to splash into the exhaust pipe, causing the fuel to overflow from the exhaust pipe. Or when the fuel pump topples or flips, the fuel is easily discharged to the outside through the exhaust pipe, which will cause pollution to the external environment or cause other dangers such as conflagration, etc.

In the external fuel pump in the present embodiment, the valve seat 8 is installed in the fuel chamber. One side of a valve seat body of the valve seat is provided with an installation chamber 801 for installing the valve body, and the other side of the valve seat body is an oil separator 802. The oil separator is connected to an outer wall of the installation chamber. The installation chamber is configured for fixing the pressure regulation valve 7, so that the pressure regulation valve can stably act on the fuel output pipe. The oil separator is located under the exhaust port of the exhaust pipe, which can prevent the fuel from splashing into the exhaust pipe during the shake.

Further, an anti-flip mechanism is further provided between the exhaust port of the exhaust pipe and the oil separator in the present embodiment, and the anti-flip mechanism can prevent the fuel from flowing out of the exhaust port even when the fuel pump topples or flips.

Particularly, the anti-flip mechanism includes a bottom plate and a side wall 9 located under the exhaust port. The oil separator is a bottom plate. An exhaust cavity 10 is formed by the side wall and the bottom plate, and the exhaust cavity is communicated with the exhaust pipe. A movable stopper is provided in the cavity. The side wall is provided with exhaust notches 11, and the exhaust notches are communicated with the chamber. The stopper can block the exhaust pipe opening when the fuel pump topples or flips over, and the stopper is a sphere with a diameter greater than the inner diameter of the exhaust pipe. In the present embodiment, the stopper is a steel ball 12. When the flip occurs, the steel ball will block the exhaust port of the exhaust pipe under the action of gravity, to prevent the fuel from overflowing from the exhaust pipe. The side wall in the present embodiment is a section of a revolving wall, and the revolving wall extends downward from the lower opening of the exhaust pipe to approach the bottom plate. The side wall is divided into a conical wall 901 and a cylindrical wall 902. The conical wall 901 extends downward outside from the lower opening of the exhaust pipe, and the cylindrical wall 902 extends downward from the opening of the conical wall. For facilitating the production, the conical wall may be arranged outside the housing, and the cylindrical wall may be arranged inside the housing. Furthermore, the notch is provided on the cylindrical wall, and the size of the notch can be set according to actual situation provided that the steel ball cannot be allowed to fall off from the notch, and the steel ball cannot be allowed to be stuck in the notch. In the present embodiment, the notches extend from the top of the cylindrical wall, i.e. a top inner wall of the cover, to the bottom of the cylindrical wall, and the plurality of notches are provided along the circumference of the cylindrical wall. The number of the notches is optional, such as one, two, three, four or five, etc.

As another implementation in the present embodiment, the side wall extending downward to approach the bottom plate may indicate that the bottom surface of the side wall has been attached to the bottom plate, or may also indicate that the bottom surface of the side wall is close to the bottom plate, but not attached to the bottom plate.

In this way, the splashed fuel due to vibrations is prevented from entering the exhaust cavity in normal use of the fuel delivery system, and the problem of the fuel overflowing from the exhaust pipe in the exhaust cavity during flipping is overcome, thereby preventing the fuel from leaking from the exhaust pipe and improving the use safety performance of the fuel delivery system. Moreover, in the present embodiment, the valve seat of the pressure regulation valve is used as the bottom plate of the anti-flip mechanism, which not only implements the multi-functional use of the valve seat, but also can save the space in the fuel chamber and reduce the number of parts.

Particularly, the pressure regulation valve seat includes an integrated installation seat and oil separator. The outermost side of the oil separator and the outermost side of the installation chamber are both provided with installation walls 803, and the installation walls are provided with elastic clamping parts 804. The elastic clamping parts are common clamping parts. In the present embodiment. An upper portion of the elastic clamping part is connected to the installation wall, and a lower portion is far away from the installation wall. A lower outer wall of the clamping part is provided with a clamping portion 805 protruding outward.

In this way, the clamping part is elastic. A concave portion opposite to the clamping portion is provided on the inner wall of the cover or the housing, so that the valve seat can be clamped and installed in the housing to implement the fixing of the valve seat. In the present embodiment, two opposite sides of the cover are respectively provided with support lugs 201 extending downward. The support lugs are provided with installation openings 202 corresponding to the clamping portion. The valve seat and the cover are integrated to install by clamping the clamping portion into the installation openings.

In addition, in the present embodiment, edges of two sides of the oil separator are provided with oil baffles 806 arranged upward. The oil baffle at one side thereof is provided with a first oil outlet 807. The oil separator is configured to prevent the splashed fuel from entering the exhaust port better. Moreover, the oil outlet is configured to discharge the fuel poured onto the oil separator from the first oil outlet when the fuel pump flips over and the fuel pump returns to the normal position.

As another implementation in the present embodiment, the oil separator is fan-shaped, and two sides thereof gradually expand from a connection portion with the installation chamber to the outermost direction. Moreover, a lower portion of the first oil outlet is provided with a first separator 808 extending laterally from the valve seat body. The first separator is configured to avoid splashing. Although the first separator is provided at the lower portion of the first oil outlet, it does not affect the oil discharge of the first oil outlet, because a plate surface of the first separator is lower than a plate surface of the oil separator. Further, the first separator is inclined downwardly, so that the fuel is readily discharged into the oil cavity.

The installation chamber in the present embodiment is configured for installing the pressure regulation valve, and the installation chamber is an installation groove 809 having a chamber. The shape of the installation groove is set according to the shape of the pressure regulation valve. Generally, the installation groove is cylindrical. Moreover, one side of the installation groove is provided with a second oil outlet 810. An upper wall of the second oil outlet has a second separator 811 extending outside the installation groove. The first oil outlet and the second oil outlet are provided on opposite sides of the valve seat body.

The second oil outlet in the present embodiment is opposite to a valve core 13 installed in the fuel chamber of the fuel pump, and is configured to discharge the fuel in the installation chamber. The second baffle is configured to prevent the fuel in the installation chamber from entering onto the oil separator and further entering the exhaust port.

Moreover, an upper annular wall of the installation groove of the installation chamber is provided with an annular installation portion 812. A gasket 14 and a sealing ring 15 that fit the outer wall of the pressure regulation valve are installed in the annular installation portion. In this way, the fuel in the installation chamber can be further prevented from entering onto the oil separator through the gap between the installation chamber and the pressure regulation valve, and then entering the exhaust port and overflowing from the exhaust pipe. Similarly, the cover 2 is provided with a pressure regulation valve installation seat 203 that is communicated with the fuel output pipe. The pressure regulation valve mounting seat 203 is configured for installing the pressure regulation valve. The gasket 14 and the sealing ring 15 are also provided between an upper outer wall of the pressure regulation valve and the pressure regulation valve installation seat 203, which prevents the fuel in the fuel outlet pipe from overflowing downward, and then entering the exhaust port and overflowing from the exhaust pipe. Moreover, a middle outer wall of the pressure regulation valve 7 is provided with an annular limit protrusion 701, and the annular limit protrusion is configured to limit the gasket and the sealing ring.

When working, the fuel in the fuel tank is pressurized and then input into the fuel chamber through the pipe from the fuel input pipe. The fuel in the fuel chamber is pressurized by the pump and then output from the fuel output pipe. The output flow rate of the fuel output pipe can be regulated by the pressure regulation valve, and the vapor generated in the fuel chamber can be discharged through the exhaust pipe. The anti-flip mechanism can prevent the fuel from overflowing from the exhaust pipe when the terminal application machinery flips over, displaces or shakes sharply. Further, a float mechanism 16 can be further provided in the fuel chamber, and acts on a fuel input end. When the fuel in the chamber reaches a certain height, the float mechanism 16 floats up to block the fuel input end and prevents the fuel from continuing to enter the fuel chamber. In addition, the housing is provided with a wiring terminal 17 for connection with a power source to activate the fuel pump.

In addition, the outer wall of the housing 1 in the present embodiment is provided with fixing holes 101 on the left and right sides, respectively, so as to install the external fuel pump on the engine or the frame of a car.

In summary, the valve seat applied to the external fuel pump provided in the present invention can prevent the splashed fuel from entering the exhaust port and overflowing from the exhaust pipe when the fuel pump shakes. Further, the valve seat can prevent the fuel from entering the exhaust pipe and flowing out therefrom when the fuel pump flips over; and also prevents the fuel from overflowing from the installation seat of the pressure regulation valve and from overflowing through the exhaust port. The valve seat of the present embodiment is multi-functional and convenient to install with less space and fewer components, which reduces costs.

What is claimed is:

1. A valve seat for a fuel pump, comprising a valve seat body, wherein a first side of the valve seat body is provided with an installation chamber for installing a valve body, a second side of the valve seat body is an oil separator, and the oil separator is connected to an outer wall of the installation chamber.

2. The valve seat of claim 1, wherein an edge of the oil separator is provided with an oil baffle arranged upward, and the oil baffle is provided with a first oil outlet.

3. The valve seat of claim 2, wherein a lower portion of the first oil outlet is provided with a first separator extending laterally from the valve seat body.

4. The valve seat of claim 2, wherein the installation chamber is an installation groove having a cavity, and a side of the installation groove is provided with a second oil outlet.

5. The valve seat of claim 1, wherein the installation chamber is an installation groove having a cavity, and a side of the installation groove is provided with a second oil outlet.

6. The valve seat of claim 5, wherein an upper wall of the second oil outlet has a second separator extending outside the installation groove.

7. The valve seat of claim 6, wherein the first oil outlet and the second oil outlet are provided on opposite sides of the valve seat body.

8. The valve seat of claim 5, wherein the first oil outlet and the second oil outlet are provided on opposite sides of the valve seat body.

9. The valve seat of claim 1, wherein the oil separator is fan-shaped, and two sides of the oil separator gradually expand from a connection portion with the installation chamber to an outermost direction.

10. The valve seat of claim 1, wherein an outermost side of the oil separator and an outermost side of the installation chamber are both provided with installation walls, and the installation walls are provided with elastic clamping parts.

11. An external fuel pump, comprising the valve seat of claim 1, and a fuel chamber constituted by a housing and a cover, wherein the valve seat body is located in the fuel chamber, the oil separator of the valve seat body is located at a lower portion of an exhaust port provided on the cover, and an anti-flip mechanism is provided between the exhaust port and the oil separator.

12. The external fuel pump of claim 11, wherein the exhaust port is provided with an exhaust pipe extending upward, the anti-flip mechanism comprises a side wall extending downward from a lower end of the exhaust pipe, an exhaust cavity is formed by the side wall and the oil separator, the exhaust cavity is communicated with the exhaust pipe, a movable stopper is provided in the exhaust cavity, the side wall is provided with a plurality of exhaust notches, and the plurality of exhaust notches are communicated with the fuel chamber.

13. The external fuel pump of claim 12, wherein the stopper is a sphere, and a diameter of the sphere is greater than an inner diameter of the exhaust pipe.

14. The external fuel pump of claim 13, wherein the side wall has a conical wall extending downward and outward from a lower opening of the exhaust pipe, an opening of the conical wall has a cylindrical wall extending downward, and the plurality of exhaust notches are provided on the cylindrical wall.

15. The external fuel pump of claim 13, wherein the valve seat body is installed on an inner wall of the cover or housing through an elastic clamping part, a pressure regulation valve for a fuel output end is installed in the installation chamber of the valve seat body, a first gasket and a first sealing ring are provided between a lower portion of the pressure regulation valve and the installation groove, and a second gasket and a second sealing ring are provided between an upper portion of the pressure regulation valve and the cover, wherein the first gasket fits with the first sealing ring, and the second gasket fits with the second sealing ring.

16. The external fuel pump of claim 12, wherein the side wall has a conical wall extending downward and outward from a lower opening of the exhaust pipe, an opening of the conical wall has a cylindrical wall extending downward, and the plurality of exhaust notches are provided on the cylindrical wall.

17. The external fuel pump of claim 16, wherein the plurality of exhaust notches extend from a top of the cylindrical wall to a bottom of the cylindrical wall, and the plurality of exhaust notches are provided along a circumference of the cylindrical wall.

18. The external fuel pump of claim 16, wherein the valve seat body is installed on an inner wall of the cover or housing through an elastic clamping part, a pressure regulation valve for a fuel output end is installed in the installation chamber of the valve seat body, a first gasket and a first sealing ring are provided between a lower portion of the pressure regulation valve and the installation groove, and a second gasket and a second sealing ring are provided between an upper portion of the pressure regulation valve and the cover, wherein the first gasket fits with the first sealing ring, and the second gasket fits with the second sealing ring.

19. The external fuel pump of claim 12, wherein the valve seat body is installed on an inner wall of the cover or housing through an elastic clamping part, a pressure regulation valve for a fuel output end is installed in the installation chamber of the valve seat body, a first gasket and a first sealing ring are provided between a lower portion of the pressure regulation valve and the installation groove, and a second gasket and a second sealing ring are provided between an upper portion of the pressure regulation valve and the cover, wherein the first gasket fits with the first sealing ring, and the second gasket fits with the second sealing ring.

20. The external fuel pump of claim 11, wherein the valve seat body is installed on an inner wall of the cover or housing through an elastic clamping part, a pressure regulation valve for a fuel output end is installed in the installation chamber of the valve seat body, a first gasket and a first sealing ring are provided between a lower portion of the pressure regulation valve and the installation groove, and a second gasket and a second sealing ring are provided between an upper portion of the pressure regulation valve and the cover, wherein the first gasket fits with the first sealing ring, and the second gasket fits with the second sealing ring.

* * * * *